US010607778B2

(12) United States Patent
Ando et al.

(10) Patent No.: US 10,607,778 B2
(45) Date of Patent: Mar. 31, 2020

(54) CERAMIC ELECTRONIC DEVICE

(71) Applicant: TDK CORPORATION, Tokyo (JP)

(72) Inventors: Norihisa Ando, Tokyo (JP); Katsumi Kobayashi, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/819,674

(22) Filed: Nov. 21, 2017

(65) Prior Publication Data
US 2018/0211783 A1    Jul. 26, 2018

(30) Foreign Application Priority Data
Nov. 22, 2016 (JP) ................. 2016-227286

(51) Int. Cl.
| H01G 4/248 | (2006.01) |
| H01G 4/38 | (2006.01) |
| H01G 4/232 | (2006.01) |
| H01G 4/30 | (2006.01) |
| H01G 4/12 | (2006.01) |
| H01G 2/06 | (2006.01) |
| H01G 4/008 | (2006.01) |

(52) U.S. Cl.
CPC ............... *H01G 4/248* (2013.01); *H01G 2/06* (2013.01); *H01G 4/12* (2013.01); *H01G 4/232* (2013.01); *H01G 4/30* (2013.01); *H01G 4/38* (2013.01); *H01G 4/008* (2013.01)

(58) Field of Classification Search
CPC ............ H01G 4/248; H01G 2/10; H01G 2/02; H01G 2/04; H01G 2/06; H01G 4/12; H01G 4/228; H01G 4/232; H01G 4/30; H01G 4/38; H01G 4/008
See application file for complete search history.

(56) References Cited

U.S. PATENT DOCUMENTS 6,288,887 B1    9/2001  Yoshida et al.
6,310,759 B2 *  10/2001 Ishigaki ............... H01G 4/232
                                                361/309

(Continued)

FOREIGN PATENT DOCUMENTS

| CN | 104183386 A | 12/2014 |
| JP | 2000-235932 A | 8/2000 |
| JP | 2015-095490 A | 5/2015 |

*Primary Examiner* — Dion Ferguson
(74) *Attorney, Agent, or Firm* — Oliff PLC

(57) ABSTRACT

A ceramic electronic device includes multiple chip components and a pair of metal terminal portions. The chip components consist of a pair of chip end surfaces and four chip side surfaces. Terminal electrodes are formed on the pair of chip end surfaces. The pair of metal terminal portions is arranged correspondingly with the pair of chip end surfaces. Each of the pair of metal terminal portions includes an electrode face portion, a pair of engagement arm portions, and a mount portion. The electrode face portion faces the chip end surface. The pair of engagement arm portions sandwich and hold the chip component. The mount portion extends from one of terminal second sides toward the chip component and is partially substantially vertical to the electrode face portion. The electrode face portion has a slit.

17 Claims, 9 Drawing Sheets

(56) References Cited

U.S. PATENT DOCUMENTS

| | | | | |
|---|---|---|---|---|
| 6,433,992 B2* | 8/2002 | Nakagawa | ............... | H01G 4/38 |
| | | | | 361/301.4 |
| 8,315,035 B2* | 11/2012 | Togashi | ................... | H01G 2/06 |
| | | | | 361/306.1 |
| 8,570,708 B2* | 10/2013 | Itagaki | ..................... | H01G 4/30 |
| | | | | 361/301.4 |
| 8,988,857 B2* | 3/2015 | McConnell | ............. | H01G 4/30 |
| | | | | 361/306.3 |
| 9,042,079 B2* | 5/2015 | Masuda | ................... | H01G 4/01 |
| | | | | 361/301.2 |
| 9,171,672 B2* | 10/2015 | McConnell | ............. | H01G 4/38 |
| 9,613,753 B2* | 4/2017 | Maeda | ..................... | H01G 4/30 |
| 10,056,320 B2* | 8/2018 | Murrell | ................. | H01G 4/232 |
| 2003/0147440 A1* | 8/2003 | Nomura | ................ | B82Y 20/00 |
| | | | | 372/46.01 |
| 2010/0188798 A1* | 7/2010 | Togashi | ................... | H01G 2/06 |
| | | | | 361/306.3 |
| 2012/0326569 A1* | 12/2012 | Itagaki | ..................... | H01G 4/30 |
| | | | | 310/365 |
| 2014/0345927 A1 | 11/2014 | Itagaki | | |
| 2015/0131202 A1 | 5/2015 | Masuda et al. | | |

* cited by examiner

CERAMIC ELECTRONIC DEVICE

BACKGROUND OF THE INVENTION

1. Field of the Invention

The present invention relates to a ceramic electronic device having a chip component and a metal terminal attached thereto.

2. Description of the Related Art

In addition to a normal chip component that is solely directly mounted on a board or so, a chip component attached with a metal terminal is proposed as a ceramic electronic device, such as a ceramic capacitor. It is reported that the ceramic electronic device attached with a metal terminal after being mounted has a reduction effect on a deformation stress that travels from a board to a chip component and a protection effect on a chip component from impacts or so. Thus, the ceramic electronic device attached with a metal terminal is used in a field where durability, reliability, and the like are required.

It is also reported that a metal terminal has a prevention effect on a vibration generated in the chip component from traveling to a mount board. To enhance such an effect, it is proposed that a link portion be arranged between a mount portion and a connection portion (electrode face portion) of the metal terminal.

SUMMARY OF THE INVENTION

However, a conventional metal terminal with a link portion between a mount portion and a connection portion (electrode face portion) has a problem that a ceramic electronic device has a mount area (a projected area in the Z-axis direction) that is larger to some degree than a projected area of a chip component.

The present invention has been achieved under such circumstances. It is an object of the invention to provide a ceramic electronic device capable of preventing a vibration generated in a chip component from traveling to a mount board via a metal terminal, protecting the chip component from a deformation stress, an impact, and the like after being mounted, and preventing a mount area from increasing.

To achieve the above object, the ceramic electronic device according to the present invention is a ceramic electronic device comprising:

a plurality of substantially rectangular parallelepiped chip components consisting of a pair of substantially rectangular chip end surfaces having a pair of chip first sides substantially parallel to each other and a pair of chip second sides substantially parallel to each other and four chip side surfaces connecting between the pair of chip end surfaces and provided with terminal electrodes formed on the pair of chip end surfaces; and a pair of metal terminal portions arranged correspondingly with the pair of chip end surfaces, wherein each of the pair of metal terminal portions comprises:

a substantially rectangular flat electrode face portion having a pair of terminal first sides substantially parallel to the chip first sides and a pair of terminal second sides substantially parallel to the chip second sides and facing the chip end surface;

at least a pair of engagement arm portions extending from the electrode face portion toward the chip side surfaces and sandwiching and holding the chip component from both ends of the chip first sides; and a mount portion connected with one of the terminal second sides of the electrode face portion, extending from one of the terminal second sides toward the chip component, and being at least partially substantially vertical to the electrode face portion, and the electrode face portion is provided with a slit between one of the terminal second sides connected with the mount portion and a connection position of a lower arm portion that is one of the pair of engagement arm portions and is positioned near the mount portion with the electrode face portion.

In the metal terminal portions of the ceramic electronic device according to the present invention, since the mount portion is connected with the terminal second side, the ceramic electronic device according to the present invention can have a small projected area in the height direction and reduce a mount area compared to prior arts where the mount portion is connected with the terminal first sides via a connection portion.

Since the metal terminal portion of the ceramic electronic device according to the present invention is provided with the slit between the connection position of the lower arm portion and one of the terminal second sides connected with the mount portion, a solder used when the ceramic electronic device is mounted can be prevented from creeping up, and an acoustic noise can be prevented.

In the ceramic electronic device according to the present invention, the engagement arm portions sandwich and hold the chip component, and the metal terminal portions can thereby effectively demonstrate a reduction effect on stress, reduce a transmission of vibration from the chip components to the mount board, and prevent an acoustic noise.

For example, the chip components may be a multilayer capacitor where internal electrode layers and dielectric layers are laminated, and the chip components may have a lamination direction that is substantially parallel to the chip second sides.

In the ceramic electronic device, the internal electrode layers are arranged vertically to the mount surface, and ESL can be thereby lowered compared to when internal electrode layers are arranged in parallel to a mount surface. The chip first sides held by the engagement arm portions are vertical to the lamination direction, and the ceramic electronic device thereby has a small size dispersion. Thus, the metal terminal portions can more definitely hold the chip components by holding a part of the chip components having a small size dispersion.

For example, a first through hole may be formed in a part of the electrode face portion facing the chip end surfaces.

For example, a solder, a conductive adhesive, or the like that electrically and mechanically connects the chip components and the metal terminal portions can be applied after the metal terminal portions and the chip components are assembled, and the ceramic electronic device with the first through hole can be thereby manufactured easily. A state of the connection member electrically and mechanically connecting the chip components and the metal terminals can be recognized from outside the ceramic electronic device, and no manufacturing defect can be thereby generated.

For example, the electrode face portion may be provided with a plurality of protrusions protruding toward the chip end surfaces and touching the chip end surfaces.

The protrusions formed on the electrode face portion reduce an area where the electrode face portion and the chip end surfaces are directly in contact with. Thus, a vibration of the chip components can be prevented from traveling to the mount board, and an acoustic noise of the ceramic electronic device can be prevented. The protrusions form a space between the electrode face portion and the chip end surfaces. It is thereby possible to control a state of the connection member electrically and mechanically connecting the chip components and the metal terminal portions and favorably control the connection state between the chip components and the metal terminal portions.

For example, the electrode face portion may be provided with a second through hole whose periphery portion is connected with the lower arm portion.

The vicinity of the lower arm portion supporting the chip component has an easily deformable shape, and the metal terminal portions with the second through hole can thereby effectively demonstrate a reduction effect on a stress generated in the ceramic electronic device and an absorption effect on a vibration of the chip component. Thus, the ceramic electronic device having the metal terminal portions can favorably prevent an acoustic noise and have a favorable connection reliability with a mount board when being mounting.

For example, an upper arm portion that is the other of the pair of engagement arm portions may be connected with the other terminal second side of the electrode face portion, and the upper arm portion and the lower arm portion may sandwich the chip component from both ends of the terminal first sides.

In the metal terminals with the mount portion connected with one of the terminal second sides and the upper arm portion connected with the other chip second side, a height direction (terminal first side direction) can be short, and the ceramic electronic device with the metal terminal portions is advantageous in low profile. In the metal terminal portions, the lower arm portion is not connected with the terminal second sides, and the upper and lower arm portions and the mount portion can be thereby formed at positions that are overlapped in the terminal second side direction. Thus, the ceramic electronic device is advantageous in downsizing.

For example, the electrode face portion may comprise:
a plate body part facing the chip end surfaces; and
a terminal connection part positioned below the plate body part and connecting between the plate body part and the mount portion, the plate body part may be provided with a first through hole, the second through hole may be formed so that the periphery portion of the second through hole mounts the plate body part and the terminal connection part, and an opening width of the second through hole in a width direction that is a parallel direction to the terminal second sides may be larger than an opening width of the first through hole in the width direction.

The first through hole and the second through hole have any opening width in the width direction, but when the second through hole has a larger opening width, the metal terminal portion can effectively enhance a reduction effect on stress and a prevention effect on acoustic noise. When the first through hole has an opening width that is narrower than an opening width of the second through hole, a connection strength between the chip components and the electrode face portion using the connection member or so can be prevented from being excessively high, and such a ceramic electronic device can prevent an acoustic noise.

For example, the ceramic electronic device according to the present invention may comprise a plurality of the chip components, wherein the chip second sides are shorter than the chip first sides, and the electrode face portion has a plurality of pairs of the engagement arm portions corresponding with the chip components.

Since the ceramic electronic device has a height direction that is the same as a direction of the chip first sides, which are longer sides of the chip end surfaces, the metal terminal portions of the ceramic electronic device have a small projected area in the height direction of the ceramic electronic device. In the metal terminal portions of the ceramic electronic device, a height direction of the ceramic electronic device is the same as a direction of the longer sides of the chip end surfaces, and the mount area is thereby prevented from increasing even in a structure where the plurality of chip components is not laminated in the height direction but is arranged side by side in a parallel direction to the mount surface. In the structure where the plurality of chip components is arranged side by side in a parallel direction to the mount surface, such a ceramic electronic device has an unchangeable mount height even if the number of chip components changes and is thereby suitable for being mounted on a mount board used for devices with severe demands on low profile. In the ceramic electronic device with the structure where the plurality of chip components is arranged side by side in a parallel direction to the mount surface, since only one chip component is held between a pair of the engagement arm portions along an engagement direction, a connection reliability between the chip components and the metal terminal portions is high, and a high reliability for impact and vibration is obtained. The metal terminal portions, where the pair of engagement arm portions holds only one chip component along the engagement direction, can definitely hold the chip components even if the chip components have long first sides. In the ceramic electronic device, since the engagement arm portions sandwich and hold the chip components from both ends of the first sides, which are the longer sides of the chip end surfaces, the metal terminal portions can effectively demonstrate a restraint effect on stress, prevent a transmission of vibration from the chip components to a mount board, and prevent an acoustic noise.

DESCRIPTION OF THE PREFERRED EMBODIMENTS

Hereinafter, embodiments of the present invention are described based on figures.

First Embodiment

Figure 1:
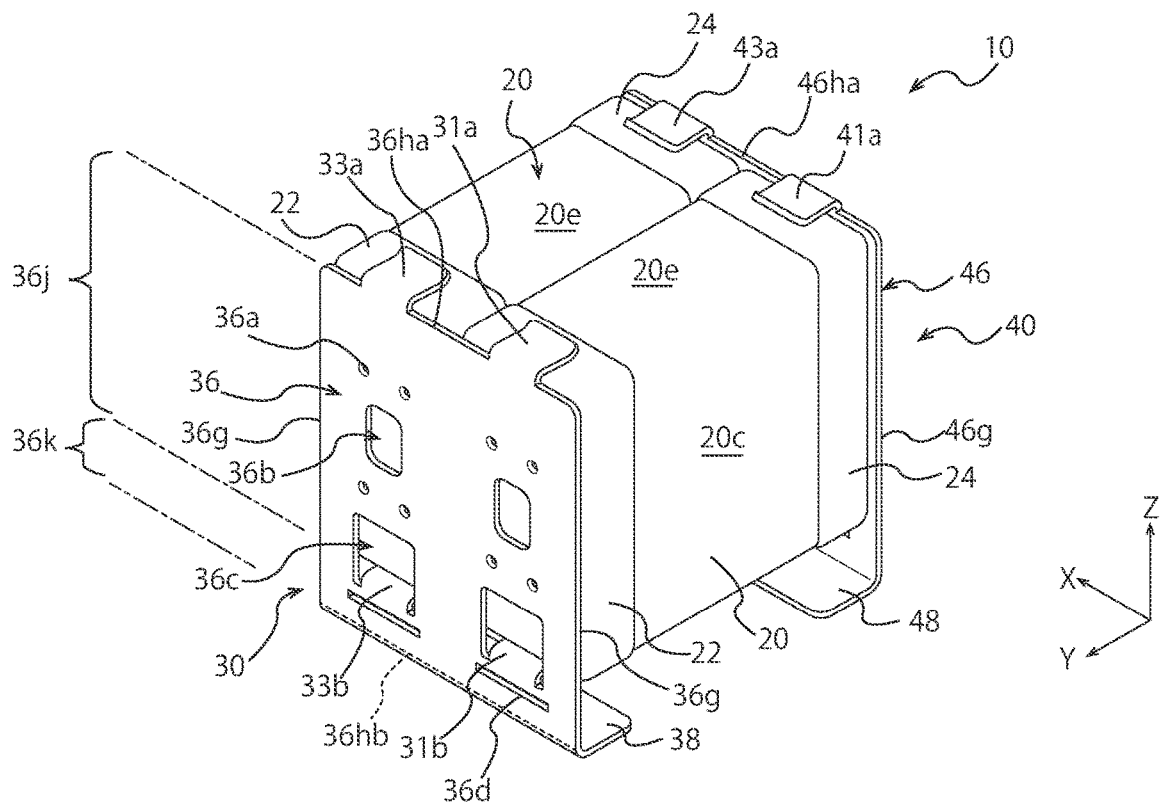
FIG. 1 is a schematic perspective view showing a ceramic electronic device according to First Embodiment of the present invention.

FIG. 1 is a schematic perspective view showing a ceramic capacitor 10 according to First Embodiment of the present invention. The ceramic capacitor 10 has chip capacitors 20 as chip components and a pair of metal terminal portions 30 and 40. The ceramic capacitor 10 according to First Embodiment has the two chip capacitors 20, but the ceramic capacitor 10 has any plural chip capacitors 20.

Incidentally, each embodiment is described with a ceramic capacitor where the chip capacitors 20 are equipped with the metal terminal portions 30 and 40, but the ceramic electronic device of the present invention is not limited to the ceramic capacitor, and may be a chip component other than capacitors equipped with the metal terminal portions 30 and 40. In the description of each embodiment, as shown in FIG. 1 to FIG. 12, the X-axis direction is a direction where first side surfaces 20c and second side surfaces 20d of the chip capacitors 20 are connected (a parallel direction to chip second sides 20h), the Y-axis is a direction where first end surfaces 20a and second end surfaces 20b are connected (a parallel direction to chip third sides 20j), and the Z-axis direction is a direction where third side surfaces 20e and fourth side surfaces 20f are connected (a parallel direction to chip first sides 20g).

Figure 2:
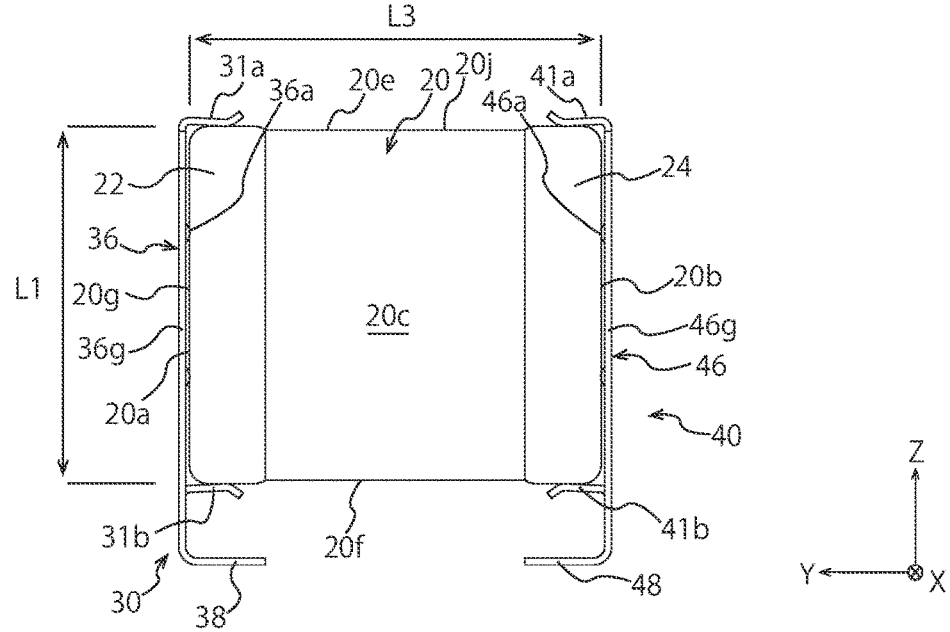
FIG. 2 is a front view of the ceramic electronic device shown in FIG. 1.

The chip capacitors 20 have an approximately rectangular parallelepiped shape, and each of the two chip capacitors 20 has approximately the same shape and size. As shown in FIG. 2, the chip capacitors 20 have a pair of chip end surfaces facing each other, and the pair of chip end surfaces consists of the first end surface 20a and the second end surface 20b. As shown in FIG. 1, FIG. 2, and FIG. 4, the first end surfaces 20a and the second end surfaces 20b have an approximately rectangular shape. In four sides constituting the rectangulars of the first end surfaces 20a and the second end surfaces 20b, a pair of longer sides is chip first sides 20g (see FIG. 2), and a pair of shorter sides is chip second sides 20h (see FIG. 3).

The chip capacitors 20 are arranged so that the first end surfaces 20a and the second end surfaces 20b are vertical to a mount surface, in other words, the chip third sides 20j of the chip capacitors 20 connecting between the first end surfaces 20a and the second end surfaces 20b are parallel to the mount surface of the ceramic capacitor 10. Incidentally, the mount surface of the ceramic capacitor 10 is a surface attached with the ceramic capacitor 10 by solder or so and facing mount portions 38 and 48 of the metal terminal portions 30 and 40 mentioned below.

When comparing a length L1 of the chip first side 20g shown in FIG. 2 and a length L2 of the chip second side 20h shown in FIG. 4, the chip second side 20h is shorter than the chip first side 20g (L1>L2). The chip first side 20g and the chip second side 20h have any length ratio, but L2/L1 is about 0.3 to 0.7, for example.

The chip capacitors 20 are arranged so that the chip first sides 20g are vertical to the mount surface as shown in FIG. 2, and that the chip second sides 20h are parallel to the mount surface as shown in FIG. 4. In the first to fourth side surfaces 20c to 20f, which are the four chip side surfaces connecting the first end surfaces 20a and the second end surfaces 20b, the first and second side surfaces 20c and 20d, whose areas are large, are arranged vertically to the mount surface, and the third and fourth side surfaces 20e and 20f, whose areas are smaller than those of the first and second side surfaces 20 and 20d, are arranged in parallel to the mount surface. The third side surfaces 20e are upper side surfaces facing the opposite direction to the mount portions 38 and 48 below, and the fourth sides surfaces 20f are lower side surfaces facing the mount portions 38 and 48.

As shown in FIG. 1, FIG. 2, and FIG. 4, first terminal electrodes 22 of the chip capacitors 20 are formed to reach from the first end surfaces 20a to a part of the first to fourth side surfaces 20c to 20f. Thus, the first terminal electrode 22 has a part arranged on the first end surface 20a and a part arranged on the first to fourth side surfaces 20c and 20f.

The second terminal electrodes 24 of the chip capacitors 20 are formed to reach from the second end surfaces 20b to another part of the first to fourth side surfaces 20c to 20f (a different part from the part where the first terminal electrodes 22 reach). Thus, the second terminal electrode 24 has a part arranged on the second end surface 20b and a part arranged on the first to fourth side surfaces 20c to 20f (see FIG. 1, FIG. 2, and FIG. 4). The first terminal electrodes 22 and the second terminal electrodes 24 are arranged with a predetermined distance on the first to fourth side surfaces 20c to 20f.

Figure 6:
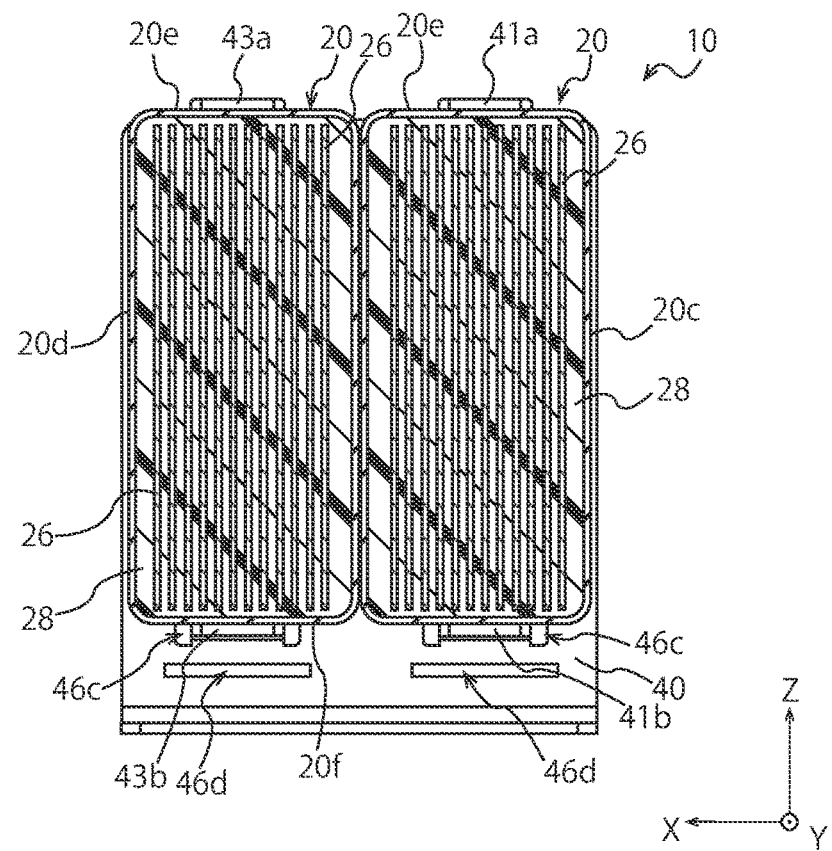
FIG. 6 is a schematic cross sectional view of the ceramic electronic device shown in FIG. 1.

As shown in FIG. 6, which schematically shows internal structures of the chip capacitors 20, the chip capacitors 20 are a multilayer capacitor where internal electrode layers 26 and dielectric layers 28 are laminated. In the internal electrode layers 26, internal electrode layers 26 connected with the first terminal electrodes 22 and internal electrode layers 26 connected with the second terminal electrodes 24 are laminated alternately by sandwiching the dielectric layers 28.

As shown in FIG. 6, the chip capacitors 20 have a lamination direction that is parallel to the chip second sides 20h shown in FIG. 4. Thus, the internal electrode layers 26 shown in FIG. 6 are arranged vertically to the mount surface.

The dielectric layers 28 of the chip capacitors 20 are composed of any dielectric material, such as calcium titanate, strontium titanate, barium titanate, and a mixture thereof. Each of the dielectric layers 28 has any thickness, but normally has a thickness of several μm to several hundred μm. In the present embodiment, each of the dielectric layers 28 preferably has a thickness of 1.0 to 5.0 μm. The dielectric layers 28 preferably have a main component of barium titanate, which can increase capacitance of capacitors.

The internal electrode layers 26 contain any conductive material, but may contain a comparatively inexpensive base metal when the dielectric layers 28 are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers 26 may be formed using a commercially available electrode paste. Each of the internal electrode layers 26 has a thickness appropriately determined based on usage or so.

The first and second terminal electrodes 22 and 24 are also composed of any material. The first and second terminal electrodes 22 and 24 are normally composed of copper, copper alloy, nickel, nickel alloy, or the like, but may be composed of silver, an alloy of silver and palladium. Each of the first and second terminal electrodes 22 and 24 also has any thickness, but normally has a thickness of about 10 to 50 µm. Incidentally, at least one metal film of Ni, Cu, Sn, etc. may be formed on the surfaces of the first and second terminal electrodes 22 and 24.

The chip capacitors 20 have shape and size that are appropriately determined based on object and usage. For example, the chip capacitor 20 has a length (L3) of 1.0 to 6.5 mm, preferably 3.2 to 5.9 mm, a width (L1) of 0.5 to 5.5 mm, preferably 1.6 to 5.2 mm, and a thickness (L2) of 0.3 to 3.2 mm, preferably 0.8 to 2.9 mm. When the ceramic capacitor 10 has a plurality of the chip capacitors 20, each of the chip capacitors 20 may have mutually different size and shape.

A pair of the metal terminal portions 30 and 40 of the ceramic capacitor 10 is arranged correspondingly with the first and second end surfaces 20a and 20b, which are a pair of chip end surfaces. That is, the first metal terminal portion 30, which is one of the pair of the metal terminal portions 30 and 40, is arranged correspondingly with the first terminal electrodes 22, which are one of the pair of the terminal electrodes 22 and 24, and the second metal terminal portion 40, which is the other of the pair of the metal terminal portions 30 and 40, is arranged correspondingly with the second terminal electrodes 24, which are the other of the pair of the terminal electrodes 22 and 24.

The first metal terminal portion 30 has an electrode face portion 36, a plurality of pairs of engagement arm portions 31a, 31b, 33a, and 33b, and a mount portion 38. The electrode face portion 36 faces the first terminal electrodes 22. The engagement arm portions 31a, 31b, 33a, and 33b sandwich and hold the chip capacitors 20 from both ends of the chip first sides 20g in the Z-axis direction. The mount portion 38 extends from the electrode face portion 36 toward the chip capacitors 20 and is at least partially approximately vertical to the electrode face portion 36.

Figure 3:
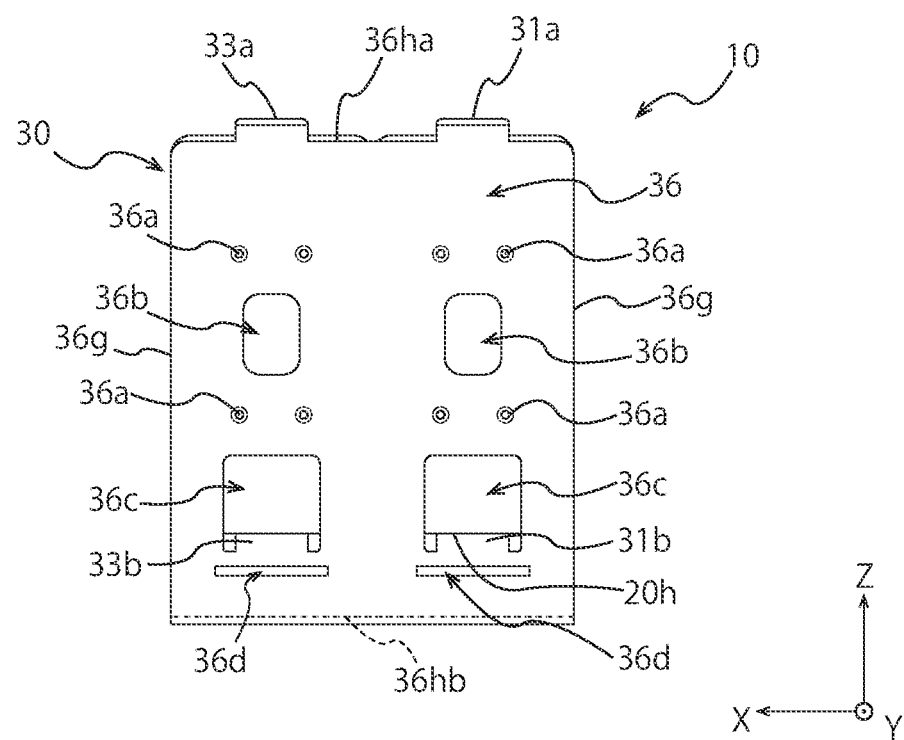
FIG. 3 is a left side view of the ceramic electronic device shown in FIG. 1.
Figure 4:
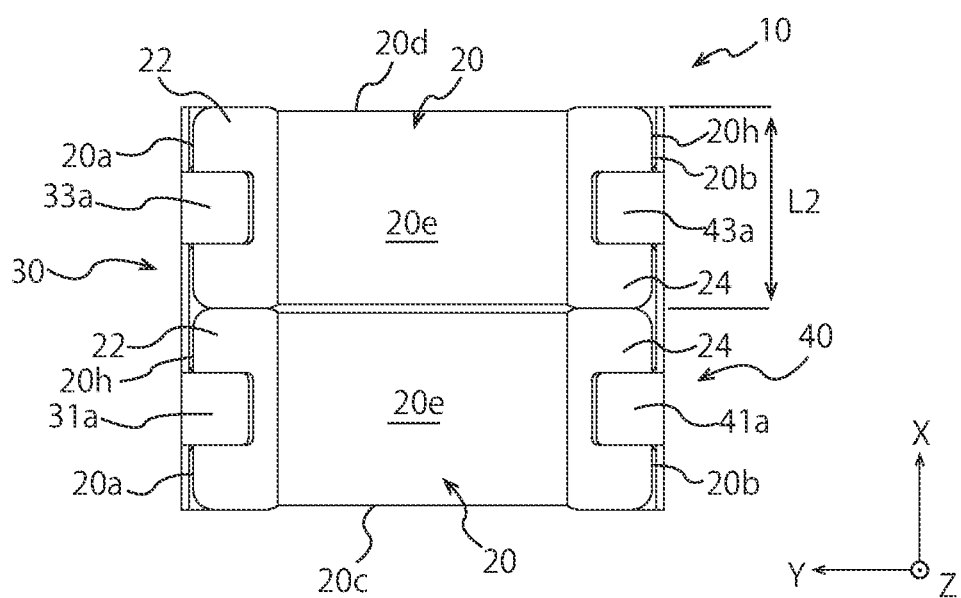
FIG. 4 is a top view of the ceramic electronic device shown in FIG. 1.

As shown in FIG. 2, the electrode face portion 36 has a substantially rectangular flat shape having a pair of terminal first sides 36g approximately parallel to the chip first sides 20g vertical to the mount surface and a pair of terminal second sides 36ha and 36hb approximately parallel to the chip second sides 20h approximately parallel to the mount surface as shown in FIG. 3.

Figure 12:
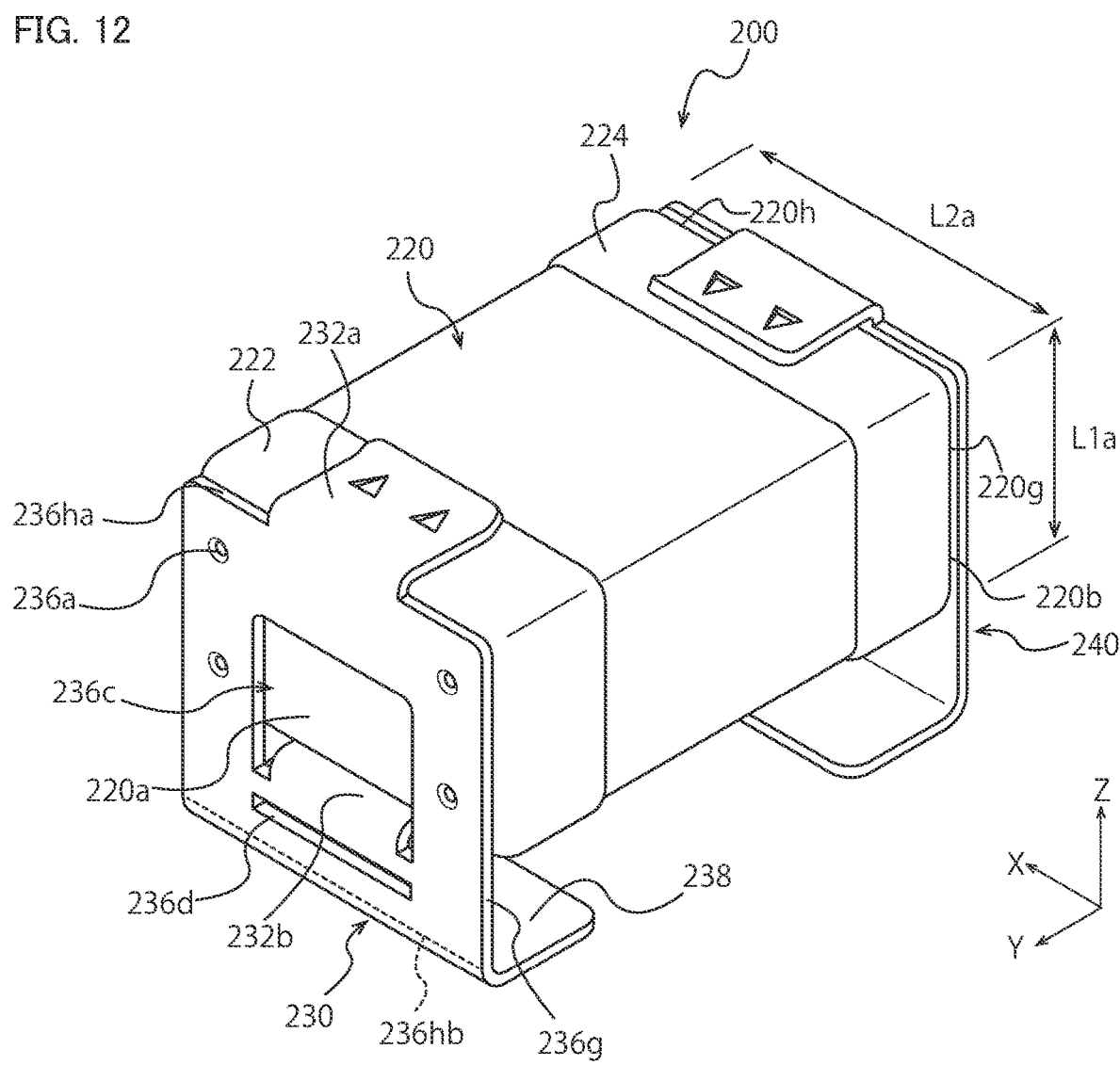
FIG. 12 is a schematic perspective view showing a ceramic electronic device according to Third Embodiment of the present invention.

As shown in FIG. 3 and FIG. 12, which is about First Variation, the terminal second sides 36ha and 36hb parallel to the mount surface have a length that may be equal to, slightly shorter, or slightly longer than a length obtained by multiplying a length L2 of the chip second side 20h arranged in parallel to the terminal second sides 36ha and 36hb and the number of the chip capacitors 20 contained in the ceramic capacitor 10 or 400.

Figure 13:
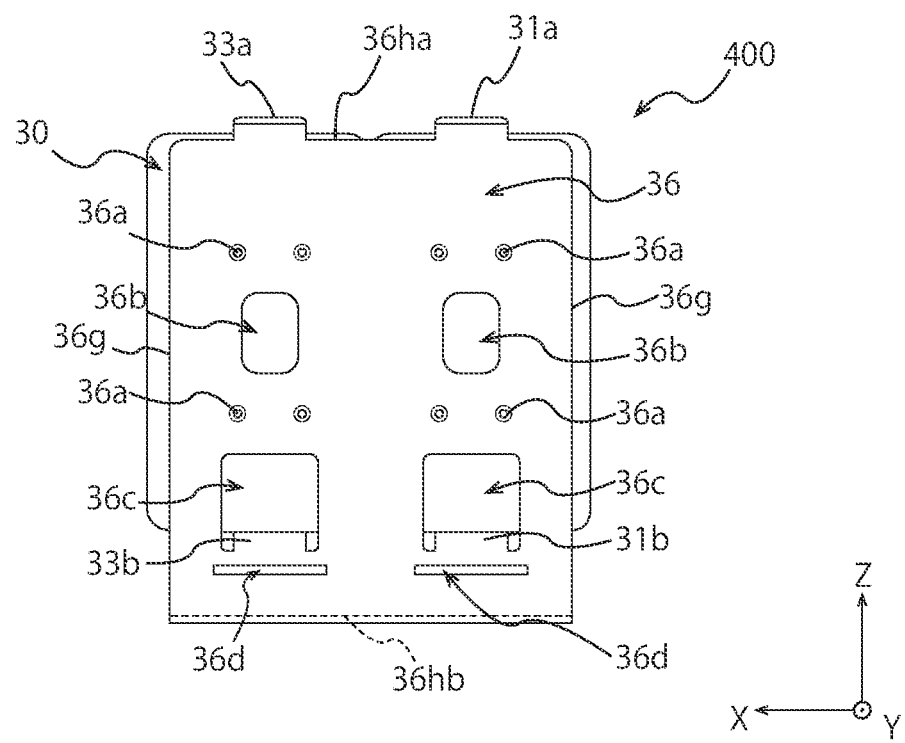
FIG. 13 is a left side view of a ceramic electronic device according to First Variation.

For example, a ceramic capacitor 400 according to First Variation shown in FIG. 13 includes two chip capacitors, and terminal second sides 36ha and 36hb parallel to a mount surface have a length that is shorter than a double of a length L2 of a chip second side 20h arranged in parallel to the terminal second sides 36ha and 36hb. Incidentally, the ceramic capacitor 400 is the same as the ceramic capacitor 10 shown in FIG. 1 to FIG. 7 except that the chip second sides of the chip capacitors have a length that is longer than the chip second sides 20h of the chip capacitors 20 according to the embodiment.

On the other hand, the ceramic capacitor 10 according to First Embodiment shown in FIG. 3 includes two chip capacitors, and the terminal second sides 36ha and 36hb parallel to the mount surface have a length that is slightly longer than a double of a length L2 of the chip second side 20h arranged in parallel to the terminal second sides 36ha and 36hb. As shown in FIG. 3 and FIG. 12, a chip capacitor that can be combined with the metal terminals 30 and 40 does not have only one size, and the metal terminals 30 and 40 can constitute a ceramic capacitor correspondingly with multiple kinds of chip capacitors having chip second sides whose lengths are different from each other.

The electrode face portion 36 is electrically and mechanically connected with the first terminal electrodes 22 formed on the first end surfaces 20a facing the electrode face portion 36. For example, the electrode face portion 36 and the first terminal electrodes 22 can be connected with each other by arranging a conductive connection member, such as a solder and a conductive adhesive, in a space between the electrode face portion 36 and the first terminal electrodes 22 shown in FIG. 4. Incidentally, when the first metal terminal portion 30 and the first terminal electrodes 22 are connected electrically by contact portions between the engagement arm portions 31a, 31b, 33a, and 33b mentioned below and the first terminal electrodes 22, connection members between the electrode face portion 36 and the first terminal electrodes 22 may be a non-conductive adhesive or so, such as an epoxy resin and a phenol resin.

First through holes 36b are formed on a part of the electrode face portion 36 facing the first end surfaces 20a. Two first through holes 36b are formed correspondingly with the chip capacitors 20 contained in the ceramic capacitor 10, but any shape and number of the first through holes 36b are formed.

The first through holes 36b is provided with connection members connecting between the electrode face portion 36 and the first terminal electrodes 22. The connection members are preferably composed of a conductive material, such as a solder and a conductive adhesive. For example, a connection member composed of a solder forms a solder bridge between a periphery of the first through hole 36b and the first terminal electrode 22, and the electrode face portion 36 and the first terminal electrode 22 can be thereby joined strongly.

The electrode face portion 36 is provided with a plurality of protrusions 36a protruding toward the first end surfaces 20a of the chip capacitors 20 and touching the first end surfaces 20a. The protrusions 36a reduce a contact area between the electrode face portion 36 and the first terminal electrodes 22. This makes it possible to prevent a vibration generated in the chip capacitors 20 from traveling to the mount board via the first metal terminal portion 30 and prevent an acoustic noise of the ceramic capacitor 10.

A range where a connection member, such as a solder, is formed can be adjusted by forming the protrusions 36a around the first through holes 36b. In such a ceramic capacitor 10, an acoustic noise can be prevented while a connection strength between the electrode face portion 36 and the first terminal electrodes 22 is appropriately adjusted in an appropriate range. Incidentally, four protrusions 36a are formed around one first through hole 36b in the ceramic capacitor 10, but any number and arrangement of the protrusions 36a are employed.

The electrode face portion 36 is provided with second through holes 36c having a periphery portion connected with the lower arm portion 31b or 33b, which is one of multiple pairs of the engagement arm portions 31a, 31b, 33a, and 33b. The second through holes 36c are positioned closer to the mount portion 38 than the first through holes 36b. Unlike the first through holes 36b, the second through holes 36c are not provided with any connection member, such as a solder.

The vicinities of the lower arm portions 31b and 33b supporting the chip capacitors 20 have an easily deformable shape, and the first metal terminal portion 30 with the second through holes 36c can thereby effectively demonstrate a reduction effect on a stress generated in the ceramic capacitor 10 and an absorption effect on a vibration of the chip capacitors 20. Thus, the ceramic capacitor 10 having the first metal terminal portion 30 can favorably prevent an acoustic noise and have a favorable connection reliability with the mount board when being mounted.

The second through holes 36c have any shape, but preferably have an opening width in the width direction, which is a parallel direction (X-axis direction) to the terminal second sides 36ha and 36hb, that is wider than the first through holes 36b. When the second through holes 36c have a wide opening width, the first metal terminal portion 30 can effectively enhance a reduction effect on stress and a prevention effect on acoustic noise. When the first through holes 36b have an opening width that is narrower than an opening width of the second through holes 36c, a connection strength between the chip capacitors 20 and the electrode face portion 36 is prevented from being too strong due to an excessively scattered connection member, and such a ceramic capacitor 10 can prevent an acoustic noise.

In the electrode face portion 36, the second through hole 36c connected with the lower arm portion 31b is formed with a predetermined distance in the height direction against the terminal second side 36hb below connected with the mount portion 38, and a slit 36d is formed between the second through hole 36c and the terminal second side 36hb. In the electrode face portion 36, the slit 36d is formed between a connection position of the lower arm portion 31b positioned near the mount portion 38 with the electrode face portion 36 (a lower side of a periphery portion of the second through hole 36c) and the terminal second side 36hb below connected with the mount portion 38. The slits 36d extend in a parallel direction to the terminal second sides 36ha and 36hb. The slits 36d can prevent a solder used at the time of mounting the ceramic capacitor 10 on a mount board from creeping up on the electrode face portion 36 and prevent a formation of a solder bridge connected with the lower arm portions 31b and 33b or the first terminal electrodes 22. Thus, the ceramic capacitor 10 with the slits 36d demonstrates a prevention effect on acoustic noise.

As shown in FIG. 1 and FIG. 2, the engagement arm portions 31a, 31b, 33a, and 33b of the first metal terminal portion 30 extend from the electrode face portion 36 to the third or fourth side surfaces 20e or 20f, which are chip side surfaces of the chip capacitors 20. The lower arm portion 31b (or lower arm portion 33b), which is one of the engagement arm portions 31a, 31b, 33a, and 33b, is connected with the periphery portion of the second through hole 36c formed on the electrode face portion 36. The upper arm portion 31a (or upper arm portion 33a), which is another one of the engagement arm portions 31a, 31b, 33a, and 33b, is connected with the terminal second side 36ha at the upper part of the electrode face portion 36 (positive side of the Z-axis direction).

As shown in FIG. 1, the electrode face portion 36 has a plate body part 36j and a terminal connection part 36k. The plate body part 36j faces the first end surfaces 20a of the chip capacitors 20 and is positioned at a height overlapping with the first end surfaces 20a. The terminal connection part 36k is positioned below the plate body part 36j and connects between the plate body part 36j and the mount portion 38. The second through holes 36c are formed so that their periphery portions range the plate body part 36j and the terminal connection part 36k. The lower arm portions 31b and 33b extend from the terminal connection part 36k. That is, bases of the lower arm portions 31b and 33b are connected with lower sides of approximately rectangular periphery portions of the second through holes 36c, and the lower arm portions 31b and 33b extend from their bases toward above (positive side of the Z-axis direction) and inside (negative side of the Y-axis direction) while being bent, touch the fourth side surfaces 20f of the chip capacitors 20, and support the chip capacitors 20 from below (see FIG. 2). Thus, lower edges (chip second sides 20h below) of the first end surfaces 20a of the chip capacitors 20 are positioned above the lower sides of the periphery portions of the second through holes 36c, which are the bases of the lower arm portions 31b and 33b. When viewing the chip capacitors 20 from the positive side of the Y-axis direction as shown in FIG. 3, the lower edges (chip second sides 20h below) of the first end surfaces 20a of the chip capacitors 20 can be recognized from the side of the ceramic capacitor 10 via the second through holes 36b.

As shown in FIG. 1, a pair of the upper arm portion 31a and lower arm portion 31b holds one chip capacitor 20, and a pair of the upper arm portion 33a and lower arm portion 33b holds another one chip capacitor 20. Since a pair of the upper arm portion 31a and the lower arm portion 31b (or the upper arm portion 33a and lower arm portion 33b) holds one chip capacitor 20, not multiple chip capacitors 20, the first metal terminal portion 30 can definitely hold each of the chip capacitors 20. A pair of the upper arm portion 31a and lower arm portion 31b does not hold the chip capacitor 20 from both ends of the chip second sides 20h, which are shorter sides of the first end surface 20a, but holds the chip capacitor 20 from both ends of the chip first sides 20g, which are longer sides. This increases distances between the upper arm portions 31a and 33a and the lower arm portions 31b and 33b, and easily absorbs a vibration of the chip capacitors 20. Thus, the ceramic capacitor 10 can favorably prevent an acoustic noise.

Incidentally, a pair of the upper arm portion 31a and the lower arm portion 31b holding the chip capacitor 20 may have mutually asymmetry shapes and mutually different lengths in the width direction (lengths in the X-axis direction). Since the lower arm portions 31b and 33b extend from the terminal connection part 36k, the chip capacitors 20 have a short transmission path between the first terminal electrodes 22 and the mount board, compared to when the lower arm portions 31b and 33b are connected with the plate body part 36j.

The mount portion 38 is connected with the terminal second side 36hb below in the electrode face portion 36. The mount portion 38 extends from the terminal second side 36hb below toward the chip capacitors 20 (negative side of the Y-axis direction) and is bent approximately vertically to the electrode face portion 36. Incidentally, the top surface of the mount portion 38, which is a surface of the mount portion 38 closer to the chip capacitors 20, preferably has a solder wettability that is lower than a solder wettability of the bottom surface of the mount portion 38 in order to prevent an excessive scattering of a solder used when the chip capacitors 20 are mounted on a board.

The mount portion 38 of the ceramic capacitor 10 is mounted on a mount surface, such as a mount board, in a position facing downward as shown in FIG. 1 and FIG. 2. Thus, a height of the ceramic capacitor 10 in the Z-axis direction is a height of the ceramic capacitor 10 when being mounted. In the ceramic capacitor 10, the mount portion 38 is connected with the terminal second side 36hb on one side of the electrode face portion 36, and the upper arm portions 31a and 33a are connected with the terminal second side 36ha on the other side of the electrode face portion 36. Thus, the ceramic capacitor 10 has no unnecessary part of the length in the Z-axis direction and is advantageous in reducing its height.

Since the mount portion 38 is connected with the terminal second side 36hb on one side of the electrode face portion 36, the ceramic capacitor 10 can have a small projected area in the Z-axis direction and have a small mount area, compared to prior arts where the mount portion 38 is connected with the terminal first sides 36g of the electrode face portion 36. Since the third and fourth side surfaces 20e and 20f having small areas of the first to fourth side surfaces 20c to 20f of the chip capacitors 20 are arranged in parallel to the mount surface, the ceramic capacitor 10 can have a small mount area even if the chip capacitors 20 are not overlapped with each other in the height direction.

As shown in FIG. 1 and FIG. 2, the second metal terminal portion 40 has an electrode face portion 46, a plurality of pairs of engagement arm portions 41a, 41b, and 43a, and a mount portion 48. The electrode face portion 46 faces the second terminal electrodes 24. The engagement arm portions 41a, 41b, 43a, and 43b sandwich and hold the chip capacitors 20 from both ends of the chip first sides 20g in the Z-axis direction. The mount portion 48 extends from the electrode face portion 46 toward the chip capacitors 20 and is at least partially approximately vertical to the electrode face portion 46.

As is the case with the electrode face portion 36 of the first metal terminal portion 30, the electrode face portion 46 of the second metal terminal portion 40 has a pair of terminal first sides 46g approximately parallel to the chip first sides 20g and a terminal second side 46ha approximately parallel to the chip second sides 20h. The electrode face portion 46 is provided with protrusions 46, first through holes, second through holes, and slits 46d. As shown in FIG. 1, the second metal terminal portion 40 is arranged symmetrically to the first metal terminal portion 30, and is different from the first metal terminal portion 30 in arrangement against the chip capacitors 20. The second metal terminal portion 40 is, however, different from the first metal terminal portion 30 only in arrangement against the chip capacitors 20 and has a similar shape to the first metal terminal portion 30. Thus, the second metal terminal portion 40 are not described in detail.

The first metal terminal portion 30 and the second metal terminal portion 40 are composed of any conductive metal material, such as iron, nickel, copper, silver, and an alloy thereof. In particular, the first and second metal terminal portions 30 and 40 are preferably composed of phosphor bronze in consideration of restraining resistivity of the first and second metal terminal portions 30 and 40 and reducing ESR of the ceramic capacitor 10.

Hereinafter, a manufacturing method of the ceramic capacitor 10 is described.

Manufacturing Method of Multilayer Ceramic Chip Capacitor 20

In a manufacture of the multilayer ceramic chip capacitor 20, a laminated body is prepared by laminating green sheets (to be the dielectric layers 28 after firing) with electrode patterns to be the internal electrode layers 26 after firing, and a capacitor element body is obtained by pressurizing and firing the obtained laminated body. Moreover, the first and second terminal electrodes 22 and 24 are formed on the capacitor element body by baking and plating a terminal electrode paint, and the chip capacitor 20 is thereby obtained. A green sheet paint and an internal electrode layer paint, which are raw materials of the laminated body, a raw material of the terminal electrodes, firing conditions of the laminated body and the electrodes, and the like are not limited, and can be determined with reference to known manufacturing methods or so. In the present embodiment, ceramic green sheets whose main component is barium titanate are used as a dielectric material. In the terminal electrodes, a Cu paste is immersed and baked to form a baked layer, and a Ni plating treatment and a Sn plating treatment are conducted, whereby Cu baked layer/Ni plating layer/Sn plating layer is formed.

Manufacturing Method of Metal Terminal Portions 30 and 40

In a manufacture of the first metal terminal portion 30, a metal plate is firstly prepared. The metal plate is composed of any conductive metal material, such as iron, nickel, copper, silver, and an alloy thereof. Next, the metal plate is machined to form intermediate members having shapes of the engagement arm portions 31a to 33b, the electrode face portion 36, the mount portion 38, and the like.

Next, a metal film is formed by plating on the surfaces of the intermediate members formed by machining, and the first metal terminal portion 30 is obtained. Any material, such as Ni, Sn, and Cu, is used for the plating. In the plating treatment, a resist treatment against a top surface of the mount portion 38 can prevent the plating from attaching to the top surface of the mount portion 38. This makes it possible to generate a difference in solder wettability between the top surface and the bottom surface of the mount portion 38. Incidentally, a similar difference can be generated by conducting a plating treatment against the entire intermediate members for formation of a metal film and removing only the metal film formed on the top surface of the mount portion 38 using a laser exfoliation or so.

Incidentally, in the manufacture of the first metal terminal portions 30, a plurality of the first metal terminal portions 30 may be formed in a state of being connected with each other from a metal plate continuously formed in belt shape. The plurality of the first metal terminal portions 30 is cut into pieces before or after being connected with the chip capacitor 20.

The second metal terminal portion 40 is manufactured in a similar manner to the first metal terminal portion 30.

Assembly of Ceramic Capacitor 10

Two chip capacitors 20 obtained in the above-mentioned manner are prepared and held so that the second side surface 20d and the first side surface 20c are arranged to touch each other. Then, the first metal terminal portion 30 and the second metal terminal portion 40 are respectively attached to the first terminal electrodes 22 and the second terminal electrodes 24. Moreover, a connection member, such as a solder, is applied to the first through holes of the first and second metal terminal portions 30 and 40, and exists between the electrode face portions 36 and 46 and the first and second terminal electrodes 22 and 24. This allows the first and second metal terminal portions 30 and 40 to be electrically and mechanically connected with the first and second terminal electrodes 22 and 24 of the chip capacitors 20. Then, the ceramic capacitor 10 is obtained.

Incidentally, the connection member, such as a solder, may be applied beforehand to the electrode face portions 36 and 46 facing the first and second terminal electrodes 22 and 24 of the respective first and second metal terminal portions 30 and 40 before the first and second metal terminal portions 30 and 40 are attached to the chip capacitors 20, and may be molten again after the ceramic capacitor 10 is assembled. Incidentally, if necessary, the first and second terminal electrodes 22 and 24 and the engagement arm portions 31a to 33b and 41a to 43a engaged therewith may be adhered to each other by melting a metal plating formed on either or both of their surfaces.

In the ceramic capacitor 10 obtained in this way, a height direction of the ceramic capacitor 10 is identical to the direction of the chip first sides 20g, which are loger sides of the chip capacitors 20, and the mount portions 38 and 48 are formed by being bent from the terminal second side toward below the chip capacitors 20. Thus, the ceramic capacitor 10 has a small projected area in the height direction of the ceramic capacitor 10 (see FIG. 4 and FIG. 5), and can have a small mount area.

In the ceramic capacitor 10, where a plurality of the chip capacitors 20 is arranged side by side in the parallel direction to the mount surface, for example, only one chip capacitor 20 is held along an engagement direction (Z-axis direction) between a pair of the engagement arm portions 31a and 31b. Thus, the ceramic capacitor 10 has a high connection reliability between the chip capacitor 20 and the metal terminal portions 30 and 40, and has a high reliability for impact and vibration.

Moreover, since a plurality of the chip capacitors 20 is arranged and laminated in the parallel direction to the mount surface, the ceramic capacitor 10 has a short transmission path and can achieve a low ESL. Since the chip capacitors 20 are held vertically to the lamination direction of the chip capacitors 20, the first and second metal terminal portions 30 and 40 can hold the chip capacitors 20 without any problems even if the length L2 of the chip second side 20h of the chip capacitors 20 varies due to change in the lamination number of the chip capacitors 20 to be held. Since the first and second metal terminal portions 30 and 40 can hold the chip capacitors 20 having various lamination numbers, the ceramic capacitor 10 can flexibly respond to design change.

In the ceramic capacitor 10, the upper arm portions 31a and 33a and the lower arm portions 31b and 33b sandwich and hold the chip capacitors 20 from both ends of the chip first sides 20g, which are longer sides of the first end surfaces 20a of the chip capacitors 20. Thus, the first and second metal terminal portions 30 and 40 can effectively demonstrate a restraint effect on stress, prevent a transmission of vibration from the chip capacitors 20 to the mount board, and prevent an acoustic noise. In particular, since the lower arm portions 31b and 33b are connected with the periphery portions of the second through holes 36c, the electrode face portions 36 and 46, which support the lower arm portions supporting the chip capacitors 20, have elastically deformable shapes. Thus, the first and second metal terminal portions 30 and 40 can effectively demonstrate a restraint effect on a stress generated in the ceramic capacitor 10 and a vibration absorption effect.

Figure 5:
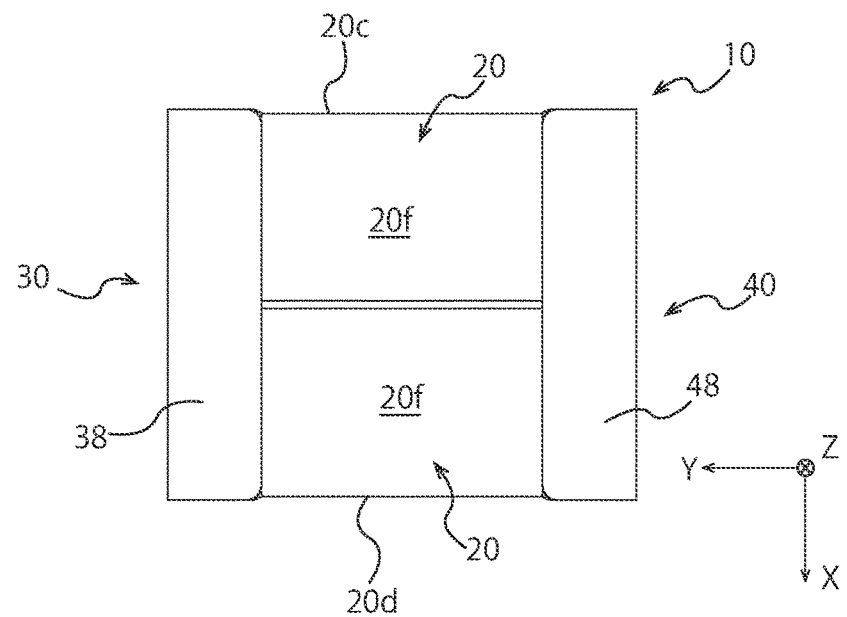
FIG. 5 is a bottom view of the ceramic electronic device shown in FIG. 1.

Since the lower arm portions 31b and 33b are connected with the periphery portions of the second through holes 36c, the ceramic capacitor 10 can arrange the lower arm portions 31b and 33b at overlapped positions with the mount portion 38 when viewed from the vertical direction (Z-axis direction) to the mount surface (see FIG. 5). Thus, the ceramic capacitor 10 can have a wide mount portion 38 and is advantageous in downsizing.

For example, the ceramic capacitor 10, where the electrode face portion 36 is provided with the first through holes 36b, can definitely connect the first and second metal terminal portions 30 and 40 and the chip capacitors 20 by applying a connection member, such as a solder, to the first through holes 36b and forming a solder bridge between the periphery portions of the first through holes 36b and the first terminal electrodes 22. Since the first through holes 36b are formed, a connection member, such as a solder, can easily exist between the first and second terminal electrodes 22 and 24 and the electrode face portions 36 and 46 even after the chip capacitors 20 and the first and second metal terminal portions 30 and 40 are assembled. Since the first through holes 36b are formed, a connection state between the first and second metal terminal portions 30 and 40 and the chip capacitors 20 can be easily recognized from outside, and the ceramic capacitor 10 can thereby have a reduced quality dispersion and an improved non-defective product ratio.

Second Embodiment

Figure 7:
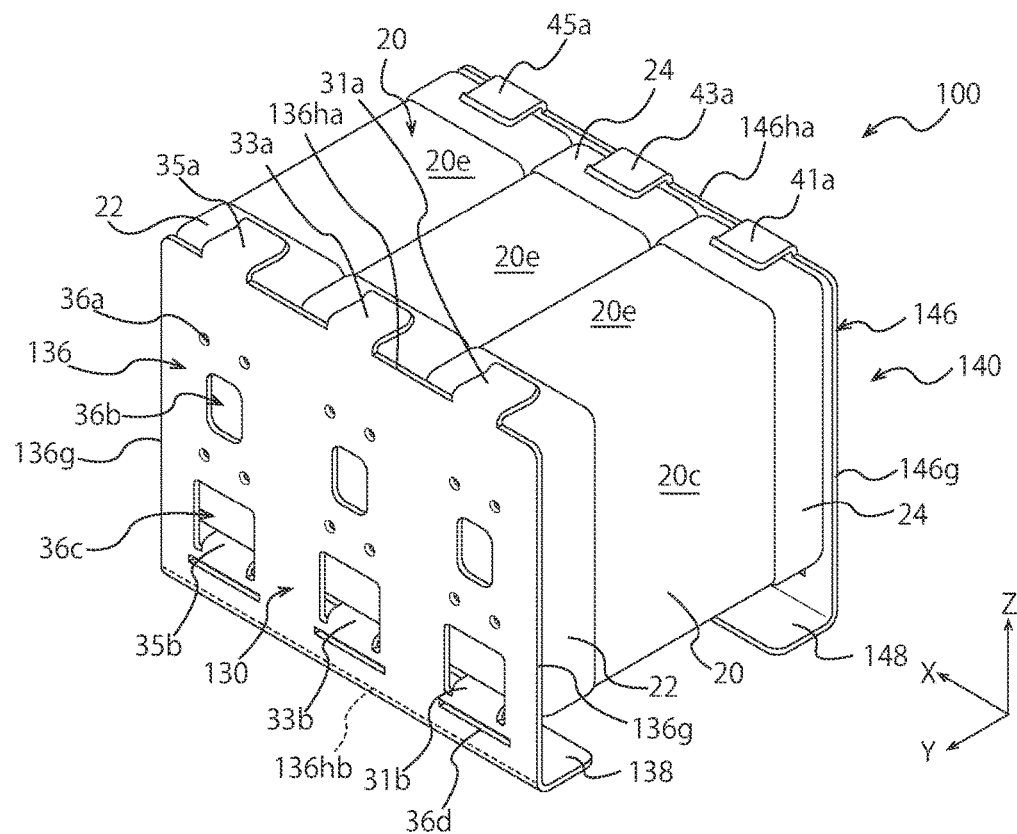
FIG. 7 is a schematic perspective view showing a ceramic electronic device according to Second Embodiment of the present invention.

FIG. 7 is a schematic perspective view of a ceramic capacitor 100 according to Second Embodiment of the present invention. FIG. 8 to FIG. 11 are respectively a front view, a left side view, a top view, and a bottom view of the ceramic capacitor 100. As shown in FIG. 7, the ceramic capacitor 100 is similar to the ceramic capacitor 10 according to First Embodiment except that the ceramic capacitor 100 has three chip capacitors 20 and a different number of first through holes 36b or so contained in a first metal terminal portion 130 and a second metal terminal portion 140. In the description of the ceramic capacitor 100, similar parts to the ceramic capacitor 10 are provided with similar references to the ceramic capacitor 10 and are not described.

Figure 8:
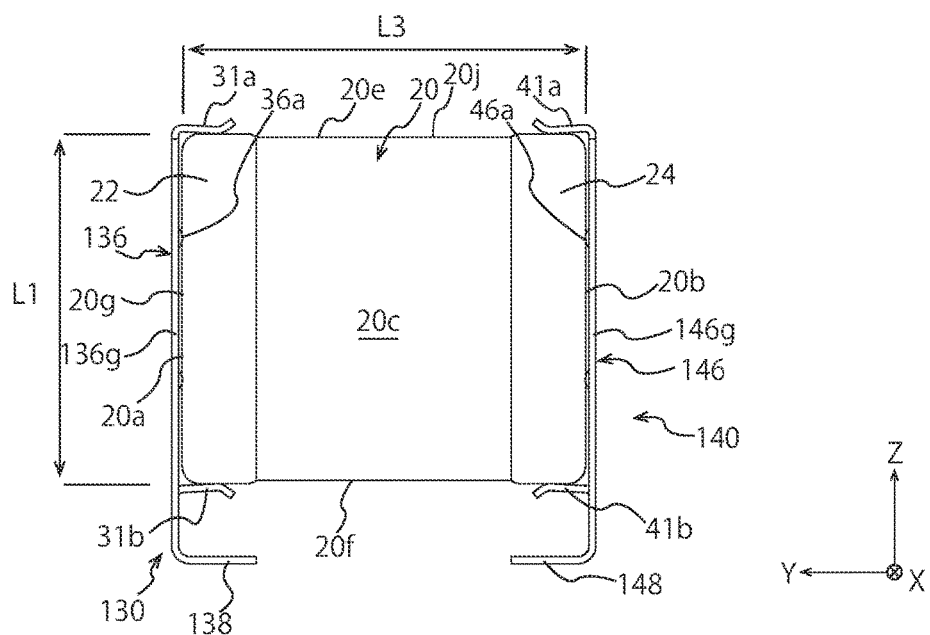
FIG. 8 is a front view of the ceramic electronic device shown in FIG. 7.
Figure 10:
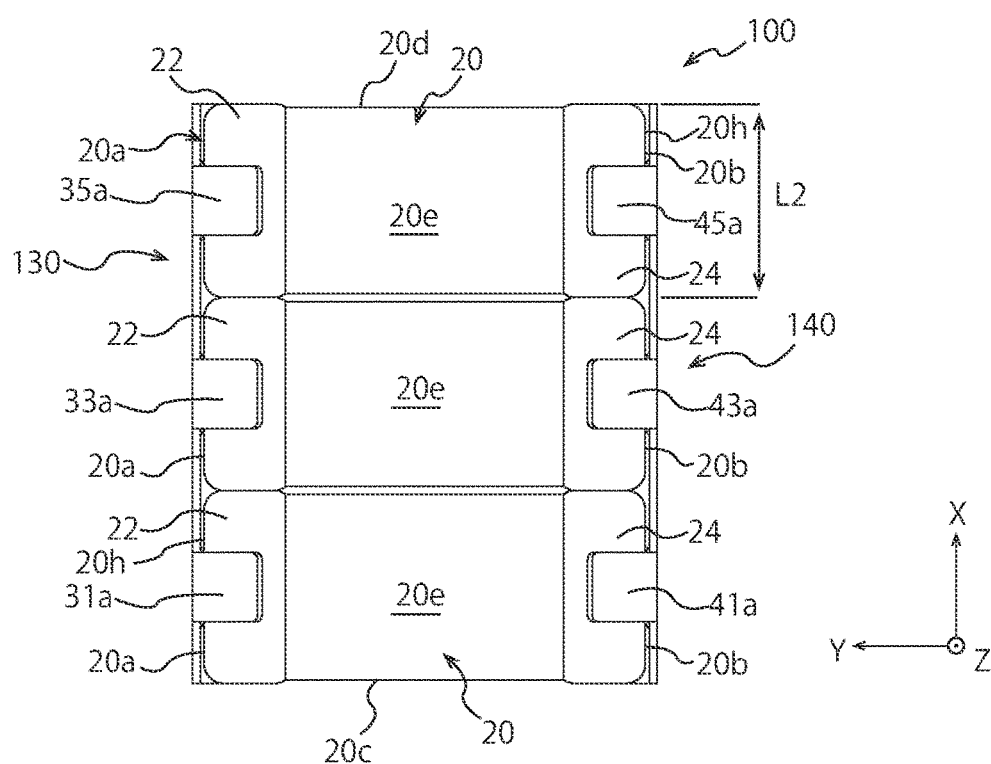
FIG. 10 is a top view of the ceramic electronic device shown in FIG. 7.

As shown in FIG. 7, the chip capacitors 20 contained in the ceramic capacitor 100 are similar to the chip capacitors 20 contained in the ceramic capacitor 10 shown in FIG. 1. The three chip capacitors 20 contained in the ceramic capacitor 100 are arranged so that chip first sides 20g are vertical to a mount surface as shown in FIG. 8, and that chip second sides 20h are parallel to a mount surface as shown in FIG. 10. The three chip capacitors 20 contained in the ceramic capacitor 100 are arranged in parallel to a mount surface so that the first terminal electrodes 22 of the chip capacitors 20 adjacent to each other are mutually in contact with, and that the second terminal electrodes 24 of the chip capacitors 20 adjacent to each other are mutually in contact with.

The first metal terminal portion 130 contained in the ceramic capacitor 100 has an electrode face portion 136, three pairs of engagement arm portions 31a, 31b, 33a, 33b, 35a, and 35b, and a mount portion 138. The electrode face portion 136 faces the first terminal electrodes 22. The three pairs of engagement arm portions 31a, 31b, 33a, 33b, 35a, and 35b hold the chip capacitors 20. The mount portion 138 is bent vertically from a terminal second side 136hb of the electrode face portion 136 toward the chip capacitors 20. The electrode face portion 136 has a substantially rectangular flat shape, and has a pair of terminal first sides 136g approximately parallel to the chip first sides 20g and a pair of terminal second sides 136ha and 136hb approximately parallel to the chip second sides 20h.

Figure 9:
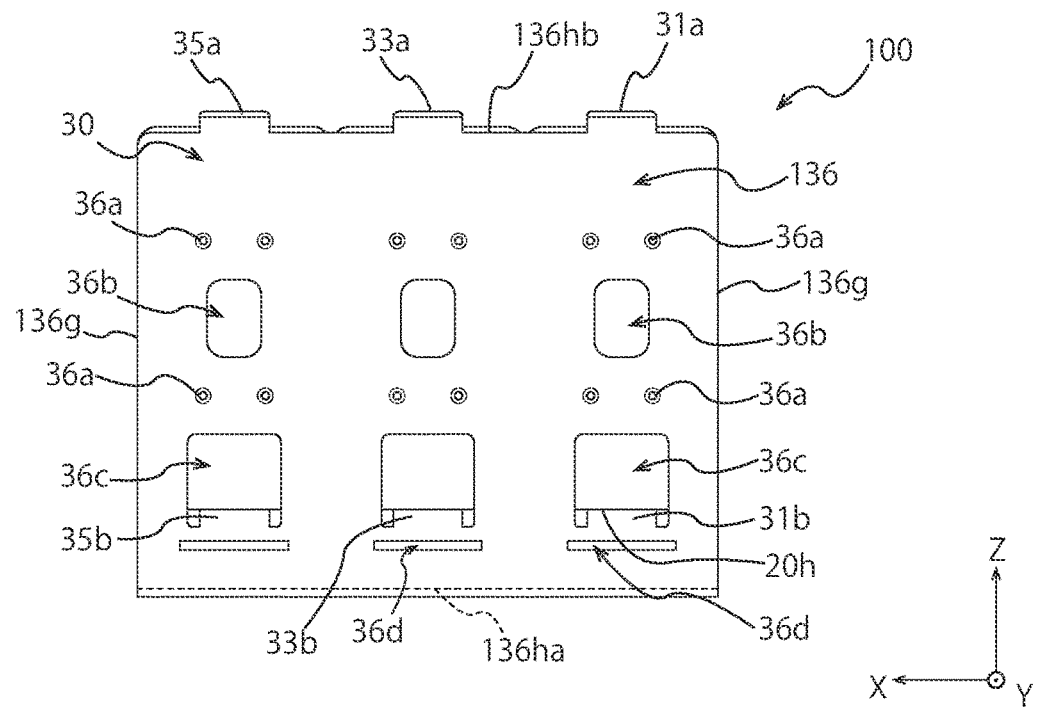
FIG. 9 is a left side view of the ceramic electronic device shown in FIG. 7.

As is the case with the first metal terminal portion 30 shown in FIG. 3, the first metal terminal portion 130 is provided with the protrusions 36a, the first through holes 36b, the second through holes 36c, and the slits 36d as shown in FIG. 9. The first metal terminal portion 130 is, however, provided with three each of the first through holes 36b, the second through holes 36c, and the slits 36d, and each of the first through holes 36b, the second through holes 36c, and the slits 36d corresponds with each of the chip capacitors 20. The first metal terminal portion 130 is provided with 12 protrusions 36a in total, and the four protrusions 36a correspond with each of the chip capacitors 20.

In the first metal terminal portion 130, as shown in FIG. 10, the upper arm portion 31a and the lower arm portion 31b hold one of the chip capacitors 20, the upper arm portion 33a and the lower arm portion 33b hold another one of the chip capacitors 20, and the upper arm portion 35a and the lower arm portion 35b hold another one of the chip capacitors 20 that is different from the above two chip capacitors 20. The upper arm portions 31a, 33a, and 35a are connected with the terminal second side 136ha at the upper part of the electrode face portion 136 (positive side of the Z-axis direction), and the lower arm portions 31b, 33b, and 35b are connected with periphery portions of the second through holes 36c.

Figure 11:
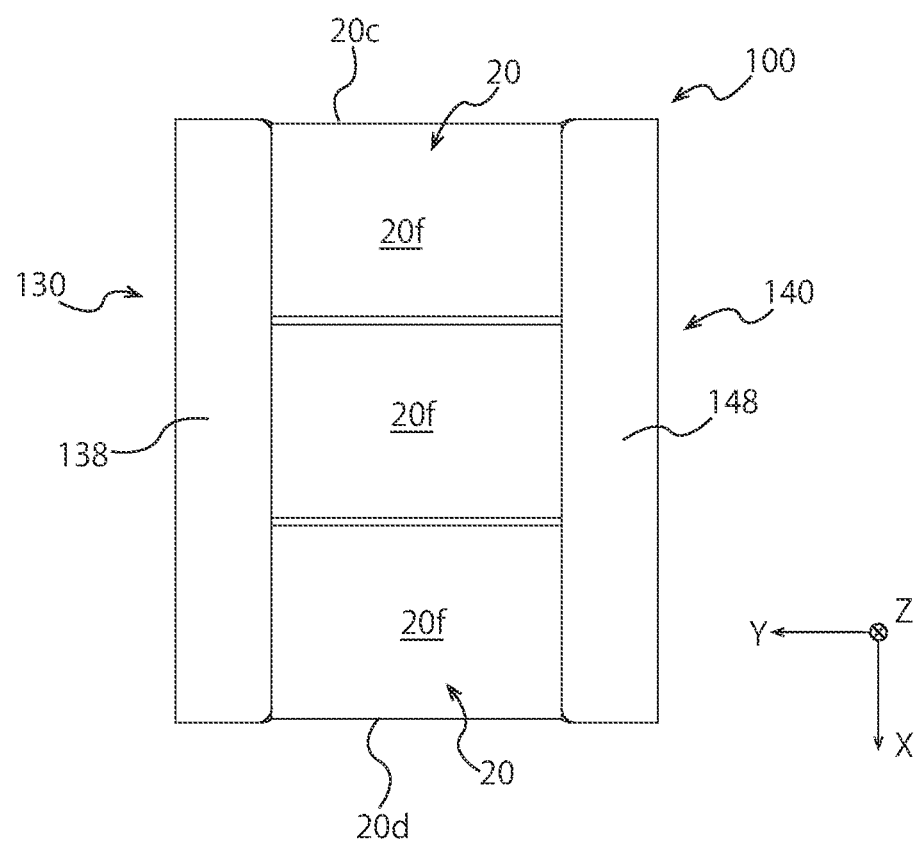
FIG. 11 is a bottom view of the ceramic electronic device shown in FIG. 7.

As shown in FIG. 8 and FIG. 11, the mount portion 138 of the first metal terminal portion 130 is connected with the terminal second side 136hb at the lower part of the electrode face portion 136 (negative side of the Z-axis direction). The mount portion 138 extends from the terminal second side 136hb below toward the chip capacitors 20 (negative side of the Y-axis direction) and is bent approximately vertically to the electrode face portion 136.

The second metal terminal portion 140 has an electrode face portion 146, a plurality of pairs of engagement arm portions 41a, 43a, and 45a, and a mount portion 148. The electrode face portion 146 faces the second terminal electrodes 24. The engagement arm portions 41a, 43a, and 45a sandwich and hold the chip capacitors 20 from both ends of the chip first sides 20g in the Z-axis direction. The mount portion 148 extends from the electrode face portion 146 toward the chip capacitors 20 and are at least partially approximately vertical to the electrode face portion 146.

As is the case with the electrode face portion 36 of the first metal terminal portion 130, the electrode face portion 146 of the second metal terminal portion 140 has a pair of terminal first sides 146g approximately parallel to the chip first side 20g and a terminal second side 146ha approximately parallel to the chip second sides 20h, and the electrode face portion 146 is provided with the protrusions 46a, first through holes, second through holes, and slits. As shown in FIG. 7, the second metal terminal portion 140 is arranged symmetrically to the first metal terminal portion 130 and is different from the first metal terminal portion 130 in arrangement to the chip capacitors 20. The second metal terminal portion 140 is, however, different from the first metal terminal portion 130 only in arrangement and has a similar shape to the first metal terminal portion 130. Thus, the second metal terminal portion 140 is not described in detail.

The ceramic capacitor 100 according to Second Embodiment has similar effects to those of the ceramic capacitor 10 according to First Embodiment. Incidentally, the number of the upper arm portions 31a to 35a, the lower arm portions 31b to 35b, the first through holes 36b, the second through holes 36c, and the slits 36d contained in the first metal terminal portion 130 of the ceramic capacitor 100 is the same as the number of the chip capacitors 20 contained in the ceramic capacitor 100, but the number of the engagement arm portions or so contained in the ceramic capacitor 100 is not limited thereto. For example, the first metal terminal portion 130 may be provided with twice as many first through holes 36b as the chip capacitors 20, or may be provided with a single continuous long slit 36d.

Third Embodiment

FIG. 12 is a schematic perspective view of a ceramic capacitor 200 according to Third Embodiment of the present invention. As shown in FIG. 12, the ceramic capacitor 200 is similar to the ceramic capacitor 10 according to First Embodiment except that the ceramic capacitor 200 has one chip capacitor 220, a chip first metal terminal portion 230 is provided with no first through hole, and the like. Thus, the ceramic capacitor 200 is not described with respect to common parts with the ceramic capacitor 10 according to First Embodiment.

The ceramic capacitor 200 has the chip capacitor 220 and first and second metal terminal portions 230 and 240 arranged correspondingly with first and second end surfaces 220a and 220b. The first and second end surfaces 220a and 220b are a pair of chip end surfaces of the chip capacitor 220.

In the chip capacitor 220 with an approximately rectangular parallelepiped shape, the first and second end surfaces 220a and 220b have a pair of chip first sides 220g parallel to each other and a pair of chip second sides 220h parallel to each other. The first end surface 220a, which is one of the pair of chip end surfaces, is provided with a first terminal electrode 222. The second end surface 220b, which is the other of the pair of chip end surfaces, is provided with a second terminal electrode 224. The first and second end surfaces 220a and 220b of the chip capacitor 220 are connected by four chip side surfaces.

In the chip capacitor 220, the chip second sides 220h, which are parallel to a mount surface, have a length L2a that is longer than a length L1a of the chip first sides 220g, which are vertical to a mount surface.

The first metal terminal portion 230 has an electrode face portion 236, a pair of engagement arm portions 232a and 232b, and a mount portion 238. The electrode face portion 236 has a substantially rectangular flat shape having terminal first sides 236g approximately parallel to the chip first sides 220g and terminal second sides 236ha and 236hb approximately parallel to the chip second sides 220h. The electrode face portion 236 faces the first end surface 220a of the chip capacitor 220.

The electrode face portion 236 is provided with a plurality of protrusions 236a protruding toward the first end surface 220a of the chip capacitor 220 and touching the first end surface 220a. The electrode face portion 236 is provided with a second through hole 236c having a periphery portion connected with the lower arm portion 232b, which is one of the engagement arm portions 232a and 232b and positioned near the mount portion 238.

Moreover, the electrode face portion 236 is provided with a slit 236d between a connection position of the lower arm portion 232b with the electrode face portion 236 and the terminal second side 236hb below, where the mount portion 238 is connected with the electrode face portion 236. The slit 236d goes through the electrode face portion 236 and has a narrow long opening shape extending in parallel to the terminal second sides 236ha and 236hb.

The pair of engagement arm portions 232a and 232b of the first metal terminal portion 230 extends from the electrode face portion 236 toward the chip side surfaces and sandwiches and holds the chip capacitor 220 from both ends of the chip first sides 220g (from both sides in the Z-axis direction). The pair of engagement arm portions 232a and 232b consists of the lower arm portion 232a and the upper arm portion 232b. The lower arm portion 232a is connected with a periphery portion of the second through hole 236c of the electrode face portion 236. The upper arm portion 232b is connected with the terminal second side 236ha at the upper part of the electrode face portion 236.

The mount portion 238 of the first metal terminal portion 230 is connected with the terminal second side 236hb at the lower part of the electrode face portion 236 and extends from the terminal second side 236hb toward the chip capacitor 220. The mount portion 238 of the first metal terminal portion 230 is approximately vertical to the electrode face portion 236 and is parallel to the mount surface.

The second metal terminal portion 240 is arranged symmetrically to the first metal terminal portion 230 and has a similar shape to the first metal terminal portion 230. Thus, the second metal terminal portion 240 is not described.

The ceramic capacitor 200 according to Third Embodiment can be manufactured in a similar manner to the ceramic capacitor 10 according to First Embodiment. The ceramic capacitor 200 may, however, be manufactured in such a manner that a connection member, such as a solder, is not arranged between the electrode face portions 236 of the first and second metal terminal portions 230 and 240 and the first and second end surfaces 220a and 220b of the chip capacitor 220. In this case, the chip capacitor 220 and the metal terminal portions 230 and 240 may be combined by only engagement, or may be combined by adhering the first and second terminal electrodes 222 and 224 and the engagement arm portions 232a and 232b in addition to engagement.

In the ceramic capacitor 200 according to Third Embodiment, the slit 236d prevents a solder from creeping up, and the metal terminal portions 230 and 240 thereby demonstrate a restraint effect on stress. Moreover, the ceramic capacitor 200 according to Third Embodiment can restrain a transmission of vibration from the chip capacitor 220 to a mount board and thereby prevent an acoustic noise when being used.

Other Embodiments

The present invention is accordingly described with the embodiments. Needless to say, the present invention is not limited to the above-mentioned embodiments and includes other variations. For example, the first metal terminal portion 30 shown in FIG. 1 is provided with all of the protrusions 36a, the first through holes 36b, the second through holes 36c, and the slits 36d, but the present invention is not limited to having such a first metal terminal portion and also includes a variation of a first metal terminal portion where one or more of the protrusions 36a, the first through holes 36b, the second through holes 36c, and the slits 36d are not formed.

FIG. 1 to FIG. 12 do not show a connection member connecting between the first metal terminal portions 30, 130, and 230 or the second metal terminal portions 40, 140, and 240 and the chip capacitors 20 and 220, but the connection member has any shape, size, and kind that are appropriately determined based on size, usage, and the like of the ceramic capacitors 10, 100, and 200.

Figure 14:
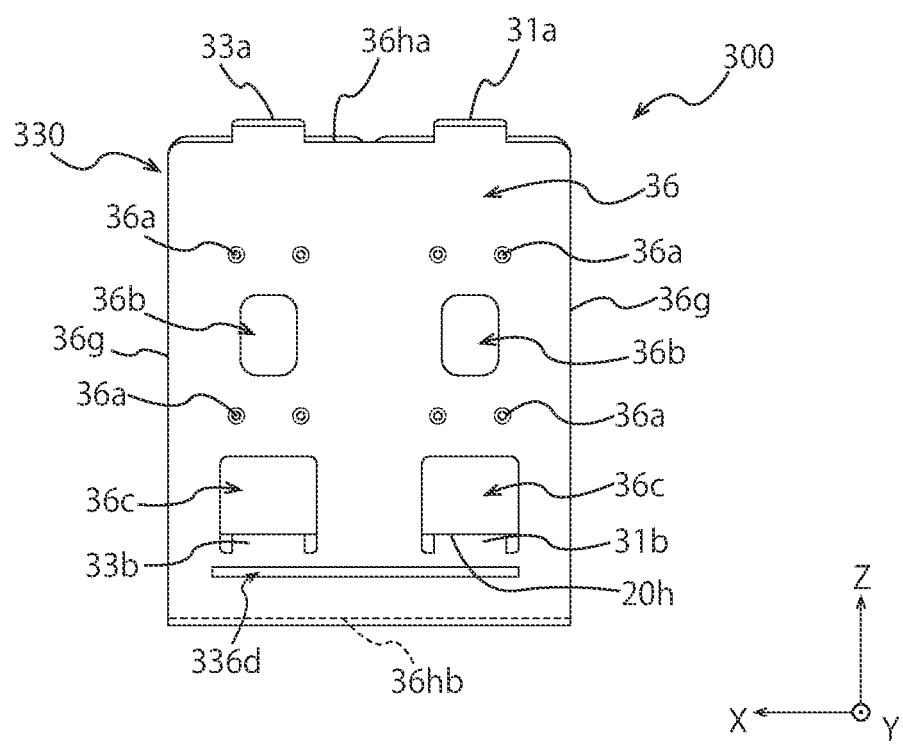
FIG. 14 is a left side view of a ceramic electronic device according to Second Variation.

FIG. 14 is a left side view showing a ceramic capacitor 300 according to Second Variation. The ceramic capacitor 300 according to Second Variation is similar to the ceramic capacitor 10 according to First Embodiment except for the shape of slits 336d formed on first and second metal terminal portions 330. As shown in FIG. 14, the first and second metal terminal portions 330 are provided with a single slit 336d formed below two second through holes 36c and continuing in the X-axis direction. The slit 336d has any shape and number as long as the slit 336d is formed between lower edges (chip second sides 20h below) of the chip capacitors 20 facing the first end surfaces 20a and the terminal second side 36hb (i.e., terminal connection part 36k).

Hereinafter, the present invention is described in detail with Example, but is not limited thereto.

A ceramic capacitor according to Example was measured with respect to inpedance Z and resistance Rs. The ceramic capacitor according to Example has the same shape as the ceramic capacitor 10 shown in FIG. 1. The measurement of inpedance Z and resistance Rs was carried out while mount portions of the ceramic capacitor was soldered to a mount board. The size of the ceramic capacitor and the measurement conditions according to Example were as below.

EXAMPLE

<Entire Size of Ceramic Capacitor>
5.0×6.0×6.4 mm
<Chip Component>
Size: (L3×L1×L2)5.7×5.0×2.5 mm
Capacitance: 15 µF
<Metal Terminals>
Material: three-layer clad material Cu—NiFe—Cu
Size of electrode face portion 36: (Z-axis direction (terminal first side 36g)×X-axis direction (terminal second side 36ha)×plate thickness)6.3×5.0×0.1 mm
Size of arm 33a: (X direction×Y direction)0.9×0.9 mm
Size of mount portion: (Y direction) 1.2 mm
<Measurement Conditions>
Frequency: 100 Hz to 10 MHz
Temperature: 25° C.

COMPARATIVE EXAMPLE

Figure 15:
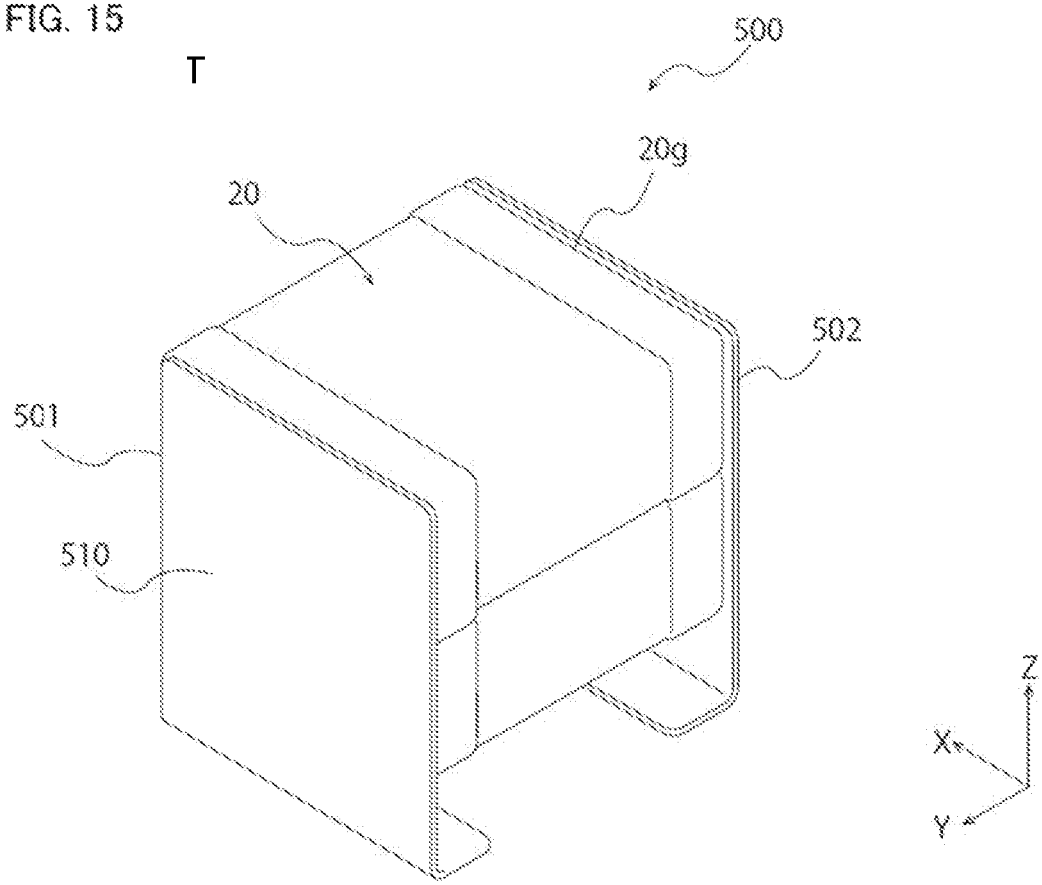
FIG. 15 is a perspective view of a ceramic capacitor according to Comparative Example.

A ceramic capacitor according to Comparative Example was measured with respect to inpedance Z and resistance Rs in a similar manner to Example. As shown in FIG. 15, metal terminals 501 and 502 with L shape are used in a ceramic capacitor 500 according to Comparative Example. Chip capacitors 20 of the ceramic capacitor 500 are similar to the chip capacitors 20 of the ceramic capacitor according to Example. In the ceramic capacitor 500, however, the chip capacitors 20 are arranged so that chip first sides 20g, which are longer sides of rectangles constituting chip end surfaces, are horizontal to a mount surface, and the two chip capacitors 20 are arranged by being overlapped in a vertical direction to the mount surface (Z-axis direction). The chip capacitors 20 are fixed to electrode face portions 510 of the metal terminals 501 and 502 by a solder.

Figure 16:
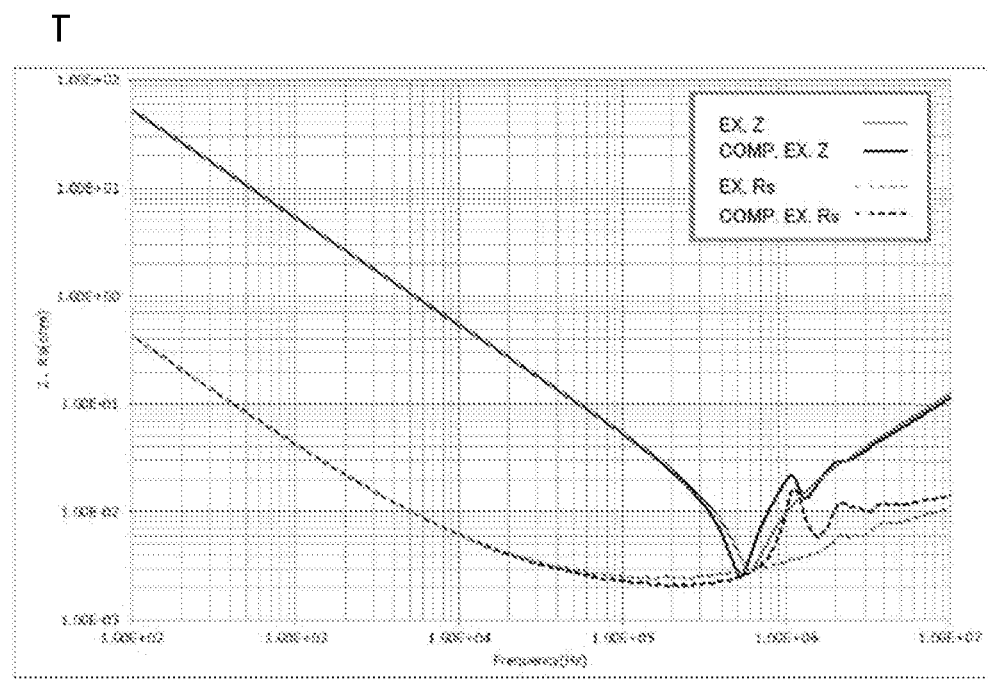
FIG. 16 is a graph showing measurement results of impedance and resistance component of ceramic capacitors according to Example and Comparative Example.

<Entire Size of Ceramic Capacitor>
5.0×6.0×6.5 mm
<Chip Component>
Same as Example
<Metal Terminals>
Material: three-layer clad material Cu—NiFe—Cu
Size of electrode face portion: (Z-axis direction×X-axis direction×plate thickness)6.5×5.0×0.1 mm Arm: none Size of mount portion: (Y direction) 1.6 mm FIG. 16 shows a graph of inpedance Z and resistance Rs measured using the ceramic capacitors according to Example and Comparative Example. In the graph shown in FIG. 16, the vertical axis represents inpedance Z and resistance Rs, and the horizontal axis represents frequency. The impedance Z measured in the ceramic capacitor according to Example had one extreme value (minimum value) at resonance points. Meanwhile, the impedance Z measured in the ceramic capacitor according to Comparative Example also had other multiple extreme values in a region whose frequency was higher than that of resonance points. In a region whose frequency was higher than resonance points where impedance Z was affected by ESL, the ceramic capacitor according to Example had small values of impedance Z compared to those of the ceramic capacitor according to Comparative Example, and it is understood that the ceramic capacitor according to Example had a lower ESL compared to that of Comparative Example.

NUMERICAL REFERENCES 10, 100, 200, 300, 400 . . . ceramic capacitor
20, 220 . . . chip capacitor
20a, 220a . . . first end surface
20b, 220b . . . second end surface
20c . . . first side surface
20d . . . second side surface
20e . . . third side surface
20f . . . fourth side surface
20g, 220g . . . chip first side
20h, 220h . . . chip second side
20j . . . chip third side
22, 222 . . . first terminal electrode
24, 224 . . . second terminal electrode
26 . . . internal electrode layer
28 . . . dielectric layer
30, 130, 40, 140, 230, 240 . . . metal terminal portion
31a, 33a, 35a, 41a, 43a, 45a, 232a . . . upper arm portion (engagement arm portion)
31b, 33b, 35b, 232b . . . lower arm portion (engagement arm portion)
36, 136, 46, 146, 236 . . . electrode face portion
36a, 46a, 236a . . . protrusion
36b . . . first through hole
36c, 236c . . . second through hole
36d, 46d, 236d . . . slit
36g, 236g . . . terminal first side
36ha, 36hb, 236ha, 236hb . . . terminal second side
38, 138, 48, 148, 238 . . . mount portion

The invention claimed is:

1. A ceramic electronic device comprising:
a plurality of substantially rectangular parallelepiped chip components consisting of a pair of substantially rectangular chip end surfaces having a pair of chip first sides substantially parallel to each other and a pair of chip second sides substantially parallel to each other and four chip side surfaces connecting the pair of chip end surfaces and provided with terminal electrodes formed on the pair of chip end surfaces; and
a pair of metal terminal portions, each of the pair of metal terminal portions extending to the pair of chip first sides and the pair of chip second sides of one of the pair of substantially rectangular chip end surfaces;
wherein each of the pair of metal terminal portions comprises:
a substantially rectangular flat electrode face portion having a pair of terminal first sides substantially parallel to the pair of chip first sides and a pair of terminal second sides substantially parallel to the pair of chip second sides and facing one of the pair of chip end surfaces;
at least a pair of engagement arm portions extending from the electrode face portion toward the chip side surfaces and sandwiching and holding at least one of the plurality of chip components from both ends of the pair of chip first sides; and
a mount portion connected with one of the pair of terminal second sides of the electrode face portion and extending from the one of the pair of terminal second sides toward the at least one of the plurality of chip components, at least a part of the mount portion being approximately perpendicular to the electrode face portion,
the electrode face portion is provided with a slit having a narrow long opening shape extending in parallel to the pair of terminal second sides between the one of the pair of terminal second sides connected with the mount portion and a lower arm portion of the pair of engagement arm portions that is positioned closer to the mount portion than another arm portion of the pair of engagement arm portions,
the electrode face portion comprises a plate body part facing and overlapping with the chip end surfaces and a terminal connection part positioned below the plate body part and connecting the plate body part and the mount portion, and
the slit is formed in the terminal connection part such that no part of the slit overlaps with the plurality of chip components or the terminal electrodes.

2. The ceramic electronic device according to claim 1, wherein
the plurality of chip components are a multilayer capacitor where internal electrode layers and dielectric layers are laminated, and
the plurality of chip components have a lamination direction that is substantially parallel to the pair of chip second sides.

3. The ceramic electronic device according to claim 1, wherein a first through hole is formed in the plate body part.

4. The ceramic electronic device according to claim 1, wherein the electrode face portion is provided with a plurality of protrusions protruding toward the pair of chip end surfaces and touching the pair of chip end surfaces.

5. The ceramic electronic device according to claim 3, wherein the electrode face portion has a second through hole whose periphery portion is connected with the lower arm portion.

6. The ceramic electronic device according to claim 5, wherein
the another arm portion and the lower arm portion sandwich the plurality of chip components from both ends of the pair of terminal first sides.

7. The ceramic electronic device according to claim 5, wherein
the second through hole is formed so that the periphery portion of the second through hole mounts the plate body part and the terminal connection part, and
an opening width of the second through hole in a width direction that is a parallel direction to the terminal second sides is larger than an opening width of the first through hole in the width direction.

8. The ceramic electronic device according to claim 1,
wherein each of the pair of chip second sides is shorter than each of the pair of chip first sides,
the electrode face portion has a plurality of pairs of the engagement arm portions, and
each of the plurality of pairs of engagement arm portions corresponds to one of the plurality of chip components.

9. A ceramic electronic device comprising:
a plurality of substantially rectangular parallelepiped chip components consisting of a pair of substantially rectangular chip end surfaces having a pair of chip first sides substantially parallel to each other and a pair of chip second sides substantially parallel to each other and four chip side surfaces connecting the pair of chip end surfaces and provided with terminal electrodes formed on the pair of chip end surfaces; and
a pair of metal terminal portions, each of the pair of metal terminal portions extending to the pair of chip first sides and the pair of chip second sides of one of the pair of substantially rectangular chip end surfaces,
wherein each of the pair of metal terminal portions comprises:
a substantially rectangular flat electrode face portion having a pair of terminal first sides substantially parallel to the pair of chip first sides and a pair of terminal second sides substantially parallel to the pair of chip second sides and facing one of the pair of chip end surfaces;
at least a pair of engagement arm portions extending from the electrode face portion toward the chip side surfaces and sandwiching and holding at least one of the plurality of chip components from both ends of the pair of chip first sides; and
a mount portion connected with one of the pair of terminal second sides of the electrode face portion and extending from the one of the pair of terminal second sides toward the at least one of the plurality of chip components, at least a part of the mount portion being approximately perpendicular to the electrode face portion,
the electrode face portion has a through hole whose periphery portion is connected with a lower arm portion of the pair of engagement arm portions that is positioned closer to the mount portion than another arm portion of the pair of engagement arm portions,
a slit is formed between the one of the terminal second sides connected with the mount portion and the lower arm portion,
the electrode face portion comprises a plate body part facing and overlapping with the chip end surfaces and a terminal connection part positioned below the plate body part and connecting the plate body part and the mount portion, and
the slit is formed in the terminal connection part such that no part of the slit overlaps with the plurality of chip components or the terminal electrodes.

10. The ceramic electronic device according to claim 9, wherein
the plurality of chip components are a multilayer capacitor where internal electrode layers and dielectric layers are laminated, and
the plurality of chip components have a lamination direction that is substantially parallel to the pair of chip second sides.

11. The ceramic electronic device according to claim 9, wherein a second through hole is formed in the plate body part.

12. The ceramic electronic device according to claim 9, wherein the electrode face portion is provided with a plurality of protrusions protruding toward the pair of chip end surfaces and touching the pair of chip end surfaces.

13. The ceramic electronic device according to claim 9, wherein
the another arm portion and the lower arm portion sandwich the plurality of chip components from both ends of the pair of terminal first sides.

14. The ceramic electronic device according to claim 13, wherein
the second through hole is formed so that the periphery portion of the second through hole mounts the plate body part and the terminal connection part, and
an opening width of the second through hole in a width direction that is a parallel direction to the terminal second sides is larger than an opening width of the first through hole in the width direction.

15. The ceramic electronic device according to claim 9, wherein each of the pair of chip second sides is shorter than each of the pair of chip first sides,
the electrode face portion has a plurality of pairs of the engagement arm portions, and
each of the plurality of pair of the engagement arm positions corresponds to one of the plurality of chip components.

16. A ceramic electronic device comprising:
a plurality of substantially rectangular parallelepiped chip components consisting of a pair of substantially rectangular chip end surfaces having a pair of chip first sides substantially parallel to each other and a pair of chip second sides substantially parallel to each other and four chip side surfaces connecting the pair of chip end surfaces and provided with terminal electrodes formed on and that entirely cover the pair of chip end surfaces; and
a pair of metal terminal portions facing the pair of the chip end surfaces,
wherein each of the pair of metal terminal portions comprises:
a substantially rectangular flat electrode face portion having a pair of terminal first sides substantially parallel to the pair of chip first sides and a pair of terminal second sides substantially parallel to the pair of chip second sides and facing one of the pair of chip end surfaces;
at least a pair of engagement arm portions extending from the electrode face portion toward the chip side surfaces and sandwiching and holding at least one of the plurality of chip components from both ends of the pair of chip first sides; and
a mount portion connected with one of the pair of terminal second sides of the electrode face portion and extending from the one of the pair of terminal second sides toward the at least one of the plurality of chip components, at least a part of the mount portion being approximately perpendicular to the electrode face portion,
the electrode face portion is provided with a slit having a narrow long opening shape extending in parallel to the pair of terminal second sides between the one of the pair of terminal second sides connected with the mount portion and a lower arm portion of the pair of engagement arm portions that is positioned closer to the mount portion than another arm portion of the pair of engagement arm portions, the electrode face portion comprises a plate body part facing and overlapping with the chip end surfaces and a terminal connection part positioned below the plate body part and connecting the plate body part and the mount portion, and the slit is formed in the terminal connection part such that no part of the slit overlaps with the plurality of chip components or the pair of metal terminal portions.

17. A ceramic electronic device comprising:

a plurality of substantially rectangular parallelepiped chip components consisting of a pair of substantially rectangular chip end surfaces having a pair of chip first sides substantially parallel to each other and a pair of chip second sides substantially parallel to each other and four chip side surfaces connecting the pair of chip end surfaces and provided with terminal electrodes formed on and that entirely cover the pair of chip end surfaces; and a pair of metal terminal portions facing the pair of the chip end surfaces, wherein each of the pair of metal terminal portions comprises:

a substantially rectangular flat electrode face portion having a pair of terminal first sides substantially parallel to the pair of chip first sides and a pair of terminal second sides substantially parallel to the pair of chip second sides and facing one of the pair of chip end surfaces;

at least a pair of engagement arm portions extending from the electrode face portion toward the chip side surfaces and sandwiching and holding at least one of the plurality of chip components from both ends of the pair of chip first sides; and a mount portion connected with one of the pair of terminal second sides of the electrode face portion and extending from the one of the pair of terminal second sides toward the at least one of the plurality of chip components, at least a part of the mount portion being approximately perpendicular to the electrode face portion, the electrode face portion has a through hole whose periphery portion is connected with a lower arm portion of the pair of engagement arm portions that is positioned closer to the mount portion than another arm portion of the pair of engagement arm portions, a slit is formed between the one of the terminal second sides connected with the mount portion and the lower arm portion, the electrode face portion comprises a plate body part facing and overlapping with the chip end surfaces and a terminal connection part positioned below the plate body part and connecting the plate body part and the mount portion, and the slit is formed in the terminal connection part such that no part of the slit overlaps with the plurality of chip components or the pair of metal terminal portions.

* * * * *